S. F. WILSON.
DISH WASHING MACHINE.
APPLICATION FILED MAR. 28, 1921.
1,406,599.
Patented Feb. 14, 1922.
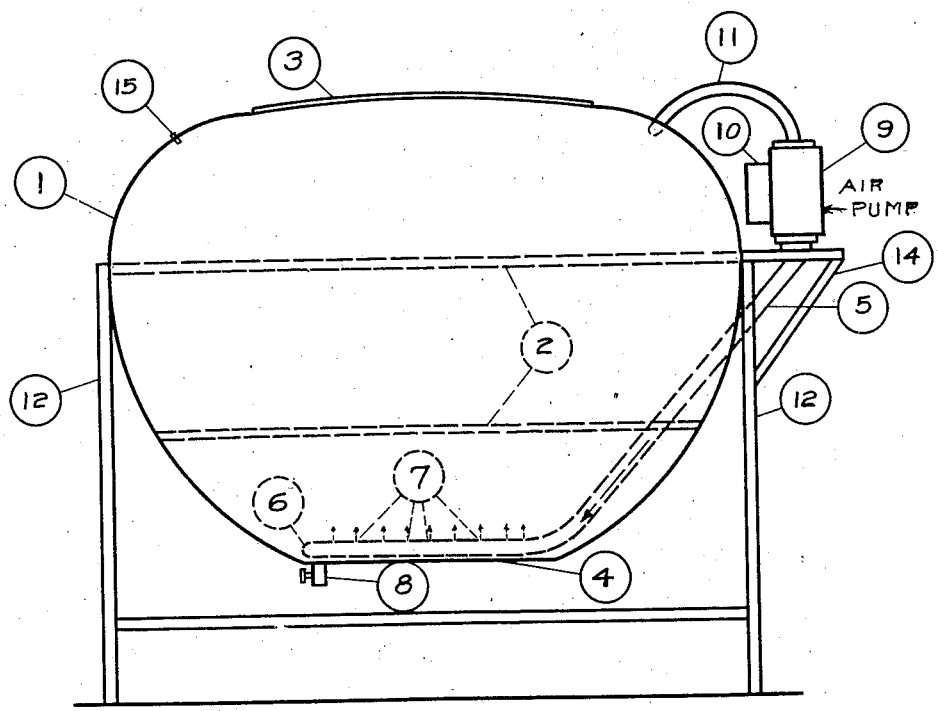
INVENTOR.
SYLVESTER F. WILSON.
By John C. Higdon
ATTORNEY.

UNITED STATES PATENT OFFICE.

SYLVESTER F. WILSON, OF EAST ST. LOUIS, ILLINOIS.

DISH-WASHING MACHINE.

1,406,599.      Specification of Letters Patent.     Patented Feb. 14, 1922.

Application filed March 28, 1921. Serial No. 456,238.

*To all whom it may concern:*

Be it known that I, SYLVESTER F. WILSON, a citizen of the United States, residing at East St. Louis, St. Clair County, in the State of Illinois, have invented certain new and useful Improvements in Dish-Washing Machines, of which the following is a specification containing a full, clear, and exact description, reference being had to the accompanying drawings, forming a part hereof.

My invention consists in the novel disclosure hereinafter particularly described and distinctly claimed.

The object of my invention is to provide an improved apparatus for washing dishes by compressed-air that is forced upwardly through and around the articles to be washed, and through the hot water in which said articles are submerged, so that the hot cleansing and rinsing water will be brought forcibly into contact with every part of said articles, as the compressed-air passes through said water, and said articles will be thoroughly and efficiently cleansed and rinsed in a very short time, and at little expense.

The drawing is an elevation of an apparatus adapted to be used in carrying out my invention.

The numeral 1 designates a washing-chamber having a series of dish-racks 2 upon its interior, in case the invention is used for washing dishes; the dishes to be washed being placed on said racks and submerged in hot water, soap-suds, or other cleansing liquid.

Said washing-chamber 1 is provided with a removable cover 3, to prevent the water and vapor, as well as the air, from escaping during the cleansing operation.

Said washing-chamber may be of any desired shape, although I have shown it with sloping walls which converge in curves to the cover-opening in the top, and to a reduced central bottom 4.

A compressed-air pipe 5 extends through an aperture in the side-wall of said chamber 1 and has a horizontal jet-section 6 at its inner end, resting upon or near the bottom 4 of said chamber; said jet-section having a series of jet-apertures 7 in its upper side, so that the air discharged from said apertures will be forced upwardly through the cleansing liquid contained in said chamber, and will agitate said liquid, and bring same into forcible contact with the articles to be cleansed, and they will be thoroughly and efficiently washed.

When it is desired to rinse the articles, the soiled water is allowed to run out of said washing-chamber through a suitable drain-cock 8.

The compressed-air for operating my invention may be taken from any common compressed-air supply, but in the present case I have shown a common air-pump rotary-fan or blower 9 that is driven by the usual electric-motor 10.

Said air-pipe 5 has its upper end connected to the said blower 9, to receive the air therefrom and carry it into the said jet-section 6, whence it is discharged into the cleansing liquid and against the clothes or articles to be washed, as before stated.

The numeral 11 designates the suction-pipe of said air-pump fan or blower 9, and said suction-pipe extends from the inlet of said blower to the upper portion of the said washing-chamber, and passes through an aperture in said washing-chamber to the interior of the latter, and is adapted to withdraw the air and vapor while it is hot, and use it over and over again; thereby obviating the necessity of forcing cold air into the washing-chamber, saving in fuel, and increasing the efficiency of the invention, over the use of cold air.

Said washing-chamber may be supported upon any sort of a frame, such as that herein designated by the numeral 12.

Said fan or blower 9 may be supported upon a bracket 14 located at one side of said frame 12.

A vent-opening 15 is formed in the top of said washing-chamber 1, for an obvious purpose.

The operation of my invention will be clearly understood from the above description.

I claim:—

An improved dish-washing machine, comprising a supporting-frame; a washing-chamber having a cover-opening in its top; a cover for said opening; said chamber being provided with a reduced central bottom, and having sloping side-walls, which converge in curves to the said cover-opening in the top, and to the said reduced central bottom; dish-racks in said chamber; a compressed-air pipe extending from the exterior of said chamber through an aperture in the wall thereof; a horizontal jet-section of said compressed-air pipe, having a series of jet-apertures and located upon said reduced central bottom; an air-pump arranged to force air through the said compressed-air pipe and its said horizontal jet-section; a motor for said air-pump; and an air suction-pipe extending from the air-inlet of said air-pump to the interior of the upper portion of said chamber; to withdraw the hot vapor and air therefrom, and return said hot vapor and air to the said air-pump, to be used over and over.

In testimony whereof, I have signed my name to this specification in presence of two subscribing witnesses.

SYLVESTER F. WILSON.

Witnesses:
J. L. GARY,
JOHN C. HIGDON.